United States Patent
Honkomp

(10) Patent No.: US 9,765,477 B2
(45) Date of Patent: Sep. 19, 2017

(54) LOW DENSITY ATTACHED POLYURETHANE FOAMS MADE USING A COMBINATION OF FROTHING AND BLOWING METHODS

(71) Applicant: DOW GLOBAL TECHNOLOGIES LLC, Midland, MI (US)

(72) Inventor: David J. Honkomp, Canton, GA (US)

(73) Assignee: Dow Global Technologies LLC, Midland, MI (US)

( * ) Notice: Subject to any disclaimer, the term of this patent is extended or adjusted under 35 U.S.C. 154(b) by 44 days.

(21) Appl. No.: 14/908,111

(22) PCT Filed: Aug. 12, 2014

(86) PCT No.: PCT/US2014/050680
§ 371 (c)(1),
(2) Date: Jan. 27, 2016

(87) PCT Pub. No.: WO2015/026567
PCT Pub. Date: Feb. 26, 2015

(65) Prior Publication Data
US 2016/0208433 A1 Jul. 21, 2016

Related U.S. Application Data

(60) Provisional application No. 61/869,413, filed on Aug. 23, 2013.

(51) Int. Cl.
| | |
|---|---|
| *D06N 7/00* | (2006.01) |
| *C08J 9/30* | (2006.01) |
| *B05D 3/00* | (2006.01) |
| *D06N 3/00* | (2006.01) |
| *B05D 5/00* | (2006.01) |
| *B05D 7/00* | (2006.01) |
| *D06N 3/14* | (2006.01) |
| *D06N 3/12* | (2006.01) |
| *C08J 9/14* | (2006.01) |
| *C08J 9/12* | (2006.01) |
| *C08J 9/02* | (2006.01) |
| *C08J 9/22* | (2006.01) |

(Continued)

(52) U.S. Cl.
CPC ........... *D06N 3/0047* (2013.01); *B05D 3/007* (2013.01); *B05D 5/00* (2013.01); *B05D 7/00* (2013.01); *C08G 18/00* (2013.01); *C08G 18/08* (2013.01); *C08G 18/242* (2013.01); *C08G 18/36* (2013.01); *C08G 18/4812* (2013.01); *C08G 18/4837* (2013.01); *C08G 18/6696* (2013.01); *C08G 18/7664* (2013.01); *C08J 9/02* (2013.01); *C08J 9/12* (2013.01); *C08J 9/14* (2013.01); *C08J 9/141* (2013.01); *C08J 9/142* (2013.01); *C08J 9/143* (2013.01); *C08J 9/144* (2013.01); *C08J 9/145* (2013.01); *C08J 9/146* (2013.01); *C08J 9/147* (2013.01); *C08J 9/148* (2013.01); *C08J 9/149* (2013.01); *C08J 9/22* (2013.01); *C08J 9/30* (2013.01); *D06N 3/005* (2013.01); *D06N 3/0043* (2013.01); *D06N 3/0086* (2013.01); *D06N 3/0088* (2013.01); *D06N 3/12* (2013.01); *D06N 3/14* (2013.01); *D06N 3/146* (2013.01); *D06N 7/0071* (2013.01); *D06N 7/0086* (2013.01); *C08G 2101/0008* (2013.01); *C08G 2101/0066* (2013.01); *C08J 2201/00* (2013.01); *C08J 2203/00* (2013.01); *C08J 2203/12* (2013.01); *C08J 2203/14* (2013.01); *C08J 2203/142* (2013.01); *C08J 2203/144* (2013.01); *C08J 2203/146* (2013.01); *C08J 2203/16* (2013.01); *C08J 2203/162* (2013.01); *C08J 2203/164* (2013.01); *C08J 2203/166* (2013.01); *C08J 2375/04* (2013.01); *C08J 2475/04* (2013.01); *D06N 2203/068* (2013.01); *D06N 2205/04* (2013.01); *D06N 2205/045* (2013.01); *D06N 2211/066* (2013.01); *D06N 2213/06* (2013.01); *D10B 2503/00* (2013.01); *D10B 2503/04* (2013.01); *D10B 2503/041* (2013.01)

(58) Field of Classification Search
CPC .... D06N 3/0043; D06N 3/0047; D06N 3/005; D06N 3/0086; D06N 3/0088; D06N 3/12; D06N 3/14; D06N 7/0071; D06N 2203/068; D06N 2205/04; D06N 2205/0045; D06N 2211/066; D06N 2213/06; C08J 9/02; C08J 9/12; C08J 9/14; C08J 9/141; C08J 9/142; C08J 9/143; C08J 9/144; C08J 9/145; C08J 9/146; C08J 9/147; C08J 9/148; C08J 9/149; C08J 9/22; C08J 9/30; C08J 2201/00; C08J 2203/00; C08J 2203/12; C08J 2203/14; C08J 2203/142; C08J 2203/244; C08J 2203/146; C08J 2203/16; C08J 2203/162; C08J 2203/164; C08J 2203/166; C08J 2375/04; C08J 2475/04; C08G 18/00; C08G 18/08; D10B 2503/04; D10B 2503/041; B05D 3/007; B05D 5/00; B05D 7/00
USPC .................................................. 427/243, 244
See application file for complete search history.

(56) References Cited

U.S. PATENT DOCUMENTS

| | | |
|---|---|---|
| 4,296,159 A | 10/1981 | Jenkines |
| 4,336,089 A | 6/1982 | Asperger |

(Continued)

*Primary Examiner* — William Phillip Fletcher, III

(57) ABSTRACT

Textiles backed with a polyurethane cushion are produced by applying a layer of frothed polyurethane-forming mixture to a surface of the textile. The mixture contains both water and a physical blowing agent. The layer expands due to the action of the water and the physical blowing agent and cures to form an attached cushion having a density of 176 g/L or less.

10 Claims, No Drawings

(51) Int. Cl.
*C08G 18/08* (2006.01)
*C08G 18/00* (2006.01)
*C08G 18/48* (2006.01)
*C08G 18/66* (2006.01)
*C08G 18/76* (2006.01)
*C08G 18/24* (2006.01)
*C08G 18/36* (2006.01)
C08G 101/00 (2006.01)

(56) References Cited

U.S. PATENT DOCUMENTS

| | | | |
|---|---|---|---|
| 4,405,393 A | 9/1983 | Tillotson | |
| 4,483,894 A | 11/1984 | Porter | |
| 4,853,054 A | 8/1989 | Turner | |
| 4,853,280 A | 8/1989 | Poteet | |
| 5,104,693 A | 4/1992 | Jenkines | |
| 5,194,453 A | 3/1993 | Jourquin | |
| 5,491,174 A | 2/1996 | Grier | |
| 5,646,195 A | 7/1997 | Mobley | |
| 6,372,810 B2 | 4/2002 | Kazmierski | |
| 6,790,872 B2 | 9/2004 | Kazmierski | |
| 2007/0197674 A1* | 8/2007 | Jennings | B32B 5/28 521/172 |
| 2010/0086708 A1* | 4/2010 | Jenkines | D06N 3/0043 428/17 |

* cited by examiner

LOW DENSITY ATTACHED POLYURETHANE FOAMS MADE USING A COMBINATION OF FROTHING AND BLOWING METHODS

The invention relates to textile having a low density frothed polyurethane backing, and to methods of making such textiles.

Carpets backed with an attached polyurethane cushion have been commercially available for many years. Methods for making those carpets are described, for example, in U.S. Pat. Nos. 4,296,159, 4,336,089, 4,405,393, 4,483,894, 4,853,054, 4,853,280, 5,104,693, 5,646,195, 6,372,810 and 6,790,872.

The attached cushion is prepared by applying a polyurethane-forming composition to the back of the carpet and permitting the composition to cure in place. A cellular structure is created by incorporating a gas into the stabilized polyurethane-forming composition.

In the vast majority of polyurethane foam manufacturing processes, the cellular structure is imparted by incorporating a chemical blowing agent and/or a physical blowing agent into the polyurethane foam formulation. A chemical blowing agent reacts under the conditions of the curing reaction to generate a gas. The most commonly used chemical blowing agent is water which, in addition to generating a gas (carbon dioxide) reacts with isocyanate groups to produce urea linkages which extend the polymer chain. Physical blowing agents are low-boiling liquids which volatilize under the curing conditions to form the blowing gas. Various types of hydrocarbons, fluorocarbons, hydrofluorocarbons and other halogenated compounds have been used.

Although blown systems have been tried in textile-backing applications (see, e.g., U.S. Pat. Nos. 4,405,393 and 4,312,817), the manufacturing process is not amenable to the use of these systems. The reason for this is that the polyurethane formulation must be dispensed, spread over the textile surface, and gauged to a predetermined thickness. These operations take some time to perform. Chemically blown systems react too quickly to accommodate these operations. They build molecular weight and viscosity so rapidly that they can be spread and gauged only with difficulty, using special equipment. Another problem is that the applied cushions are normally quite thin and therefore have a very high surface area. If the blowing agent is forming a large quantity of gas as the polyurethane formulation cures, the gas tends to escape through the exposed surface of the curing mixture, which results in a large loss of blowing efficiency. Similar considerations have essentially prevented the use of physical blowing agents in textile backing processes. Volatilization of a physical blowing agent requires an elevated temperature, which can be achieved by heating the components or through the exotherm of the curing reaction. However, increasing the temperature also increases the cure rate, so one again encounters the difficulty in applying and gauging the foam formulation before it becomes too viscous to manage. In practice, the sequencing of the blowing with the remaining steps of the process is too difficult to manage on a commercial scale.

For these reasons, commercial processes almost uniformly use a frothed polyurethane system. A gas is whipped into the foam formulation before it is applied to the textile. Because no gas needs to be generated during the curing reaction, the problem of sequencing the blowing and curing processes is eliminated. This allows these systems to be formulated so that they react slowly when first mixed. The slow initial cure allows enough time for the formulation to be mixed, dispensed, applied uniformly to the back of the carpet and gauged. The gauged foam formulation is thereafter cured relatively quickly by exposing it to an elevated temperature.

The problem with frothed systems is that it is difficult to produce a density of below 11-12 pounds/cubic foot in the cured polyurethane foam. Lower foam densities are desired in certain carpet products to obtain a softer feel, because performance demands for certain products may be less stringent, or simply to reduce costs. The inability to produce lower density frothed polyurethane carpet backings has limited the range of carpet products that have been produced with attached polyurethane cushions.

In some cases, water has been incorporated into frothed polyurethane carpet backing formulations. Examples of this practice are described, for example, in U.S. Pat. Nos. 4,853,280, 6,372,810 and 6,790,872. In the process described in U.S. Pat. No. 4,853,280, an attached polyurethane cushion is prepared from a frothed system, to which about 0.1% by weight of water (~0.2% based on the unfilled system) is added. The density of the resulting cushion is reported as 11 pounds/cubic foot. In U.S. Pat. No. 6,372,810, about 10-fold higher levels of water are incorporated into a frothed foam formulation. However, the density of the resulting attached cushion is still reported as over 12 pounds/cubic foot. The additional water does not result in a further reduction of froth density, even taking into account the higher filler levels reported the examples of U.S. Pat. No. 6,372,810. Similarly high cushion densities are reported in U.S. Pat. No. 6,790,872.

US Published Patent Application No. 2007-0197674 describes an approach whereby low density (<10 pounds/cubic foot (160 g/L)) attached cushions can be applied to textiles. A mixture of frothing and chemical blowing is used. A containment layer is applied to the exposed surface of the applied and gauged foam formulation to prevent the blowing gas from escaping, which permits foam densities below 10 pounds/cubic foot (160 g/L) to be obtained. This process has found commercial success. However, it does require a containment layer, which adds material costs, requires additional equipment, increases operating costs and introduces more complexity to the process. In addition, higher catalyst levels are needed to catalyze the water/isocyanate reaction, which in turn accelerates the curing reaction, reduces open time and makes it more difficult to apply and gauge the formulation. The use of water also produces a stiffer, harder foam than is desired in some cases.

Thus, a practical, easily controllable method by which a lower density, attached polyurethane cushion can be applied to carpet or other textiles, without need for a containment layer, is an unmet need in this industry.

This invention is a process for making a cushion-backed textile, comprising:

a) forming a frothed polyurethane-forming composition having a density of about 250 to 600 grams per liter wherein the polyurethane-forming composition includes one or more polyols including at least one polyol having a hydroxyl equivalent weight of at least 400, 0.25 to 2 parts of water per 100 parts by weight polyol(s) having a hydroxyl equivalent weight of at least 400, 3 to 10 parts by weight of a physical blowing agent having a boiling temperature of −30 to 40° C. per 100 parts by weight polyol(s) having a hydroxyl equivalent weight of at least 400, 100 to 400 parts by weight of a filler per 100 parts by weight polyol(s) having a hydroxyl equivalent weight of at least 400, a foam stabilizing surfactant, at least one polyisocyanate in an amount sufficient to provide an isocyanate index of from 85 to 130 and a polyurethane catalyst in an amount such that the polyurethane-forming composition has a gel time of at least 180 seconds;

b) forming the uncured froth into a 0.05 to 0.75 inch (0.127 to 1.9 cm) thick layer across the top surface of a textile having a width of at least 24 inches (61 cm); and c) curing the layer of the frothed composition with its top surface open to the atmosphere such that the frothed composition can freely rise to form a foamed polyurethane cushion having a density of no greater than 176 grams/liter (11 pounds/cubic foot) bonded to the textile.

The process of the invention permits good quality, low density polyurethane cushions to be attached to textiles such as carpet. Attached cushions having densities of no greater than 176 grams/liter and in many cases no greater than 160 grams/liter are readily prepared in a process that is practical for commercial scale implementation. Surprisingly, no containment layer such as is required in the process of US 2007-0197674 is needed. The cured foam tends to be softer than that formed in the process of US 2007-0197674, and so provides better cushioning, resilience and feel.

The process of the invention is characterized in that the polyurethane-forming composition is frothed, chemically blown (through the reaction of the water with isocyanate groups) and physically blown (through the volatilization of the physical blowing agent). Unlike the case where frothing is used by itself, cushion densities no greater than 176 grams/liter are easily obtained with this invention. Unlike the case in which frothing and chemical blowing are used in combination (as in US 2007-0197674), this invention provides low density attached cushions without the need for a containment layer. A further advantage of this invention over the process described in US 2007-0197674 is the polyurethane reaction tends to proceed more slowly, which provides more time for applying the froth to the substrate and forming it into a layer.

Another advantage relative to the process of US 2007-0197674 is that the physical blowing agent reduces the viscosity of the polyurethane-forming composition (at an equivalent level of fillers). This allows lower operating pressures to be used or allows higher levels of fillers to be incorporated into the composition while still maintaining working viscosities. Increasing the amount of filler can provide an important economic advantage. Still another advantage is that the cushion tends to be softer, which provides better cushioning.

A frothed polyurethane-forming composition is formed in step a) of this process. The polyurethane-forming composition contains at least one polyol, water, a liquid physical blowing agent having a boiling temperature of −30 to 40° C., filler particles, a foam-stabilizing surfactant, at least one polyisocyanate and a polyurethane catalyst. The relative amounts of these components provided to the polyurethane-forming composition are described more fully below.

The order of mixing of these ingredients is in general not critical, provided there is time to froth the composition and form it into a layer on a textile before the composition has fully expanded due to the action of the water and the physical blowing agent. However, certain orders of mixing have advantages and are therefore preferred. It is generally preferable to mix the filler with the polyol before mixing the polyol with the water, physical blowing agent and polyisocyanate. Therefore, in a preferred process, the polyol and fillers are blended, followed by addition of those other ingredients.

The surfactant is conveniently added at any time, but is preferably added to the polyol before or simultaneously with the polyisocyanate.

The polyisocyanate is preferably added to the polyol/filler mixture just prior to the frothing step.

The water may be mixed into the polyol (typically after the polyol is mixed with filler), prior to the point at which the polyol is mixed with the polyisocyanate, surfactant, catalyst and other components. However, it is preferred to introduce the water to the mixture of the filled polyol, polyisocyanate and surfactant, immediately prior to the frothing step, simultaneously with it, or less preferably, after the frothing step is completed. The reaction of the water with isocyanate tends to occur more rapidly than that of the polyol with isocyanate groups, so delaying the water addition has the advantage of slowing the initial cure and providing additional open time.

The water is conveniently added as a blend with a carrier polyol. Such a blend is often easier to mix in, because the larger volumes can be easier to meter accurately, and the higher viscosity of the polyol/water blend (compared to that of the water alone) makes it easier to mix into the other components. Additionally, selecting a polyol in which water has a high solubility increases the miscibility of the water and is believed to help disperse the water more intimately into the reaction mixture. This helps produce fine, uniform cells and can improve product durability and static load recovery. Such a carrier polyol is suitably one in which at least 30, especially at least 40, parts by weight water are soluble per 100 parts by weight polyol at room temperature (~22° C.). The mixture of carrier polyol and water suitably contains from 5 to 30% by weight water, especially from 20 to 30% water. Preferred carrier polyols include liquid (at 22° C.) homopolymers of ethylene oxide, and random or block copolymers of ethylene oxide and at least one other alkylene oxide, which contains at least 10%, more preferably at least 30%, by weight polymerized ethylene oxide.

The physical blowing agent is preferably added after the polyol and filler are mixed. More preferably, the physical blowing agent is added simultaneously with or after the time the polyisocyanate is added. The physical blowing agent can be added just prior to the frothing step, or simultaneously with the frothing step. It is possible to add the physical blowing agent after the frothing step, but this is less preferred as it can be difficult to blend the physical blowing agent into a frothed mixture.

In some embodiments, the mixture of polyol and filler, the polyisocyanate and the physical blowing agent are brought together in one or more mixing devices upstream of the frothing apparatus, mixed together and then transferred to the frothing apparatus. The water can also be introduced at such an upstream mixing device, or can be added separately either prior to or simultaneously with the frothing step.

In other embodiments, the polyol/filler mixture is combined with the polyisocyanate in a mixing device, and the physical blowing agent and water are subsequently added, again either prior to or simultaneously with the frothing step.

In still other embodiments, the polyol/filler mixture is combined with the polyisocyanate and physical blowing agent simultaneously with the frothing step, by introducing those components as separate streams into the frothing apparatus. In these embodiments, the catalyst and water each can be added prior to, during or after the frothing step. The surfactant is added no later than the frothing step in these embodiments.

If necessary, the physical blowing agent may be delivered under superatmospheric pressure and/or as a cooled stream to prevent it from volatilizing prior to being mixed with the other components. In most cases, it is expected that at least a portion of the physical blowing agent will volatilize during the frothing step and, in such a case, the physical blowing agent will continue to volatilize during the steps of applying and gauging the layer of the polyurethane-forming composition.

Adequate "open time" is required to deliver, distribute and meter or gauge the froth on the substrate. The onset of gelation can be delayed by mixing the polymerization catalyst(s) into a previously-formed froth. Catalyst addition is most preferably done simultaneously with or after the addition of the water. In the most preferred embodiments, the catalyst is added to the previously frothed composition, after the water has also been added and intimately mixed. As with the water, the catalyst is in most cases preferably added as a blend with or diluted in a polyol, to make metering and mixing easier.

When components such as the catalyst are added after the frothing step, it is preferred to subject the formulation to subsequent mixing, preferably by flowing it through a static mixing device (such as a Chemineer-Kenics mixer, TAH mixer or other motionless mixing device), in order to more uniformly blend the components. A static or motionless mixer tends not to significantly degrade the froth or the distribution of the frothing gas within the froth.

Frothing is performed by mechanically frothed by whipping air or other gas into the polyurethane-forming composition or some portion thereof, using any convenient apparatus such as an Oakes mixer, a Lessco mixer or a Hansa Frothing Unit. Methods of preparing such a mechanically frothed mixture are described in U.S. Pat. Nos. 4,853,054, 5,104,693, 5,908,701, 6,040,381, 6,096,401 and 6,555,199, all incorporated herein by reference. The polyurethane-forming composition is frothed to a froth density of about 2500 to 600, especially from 275 to 400, grams/liter prior to application.

The resulting frothed polyurethane-forming composition is then formed into a layer across the surface of a textile having a width of at least 24 inches (61 cm). The large width of the textile imposes significant constraints on the reactivity of the polyurethane-forming composition, as spreading a layer of the composition and gauging it to a predetermined thickness can take a significant amount of time when the textile is wide. The textile may be as wide as 6 meters or even more; a typical width for floor covering applications may be 1 to 3 meters, especially 1 to 2 meters. A wide variety of materials can function as the substrate, including, for example, polymeric films or sheets, carpet (including pile yarn carpet), textile fabrics, paper sheets, rigid materials such as wood, veneers, metal foils or sheets, or composites, among many others.

A substrate of particular interest is a tufted or woven carpet material, especially one having a unitary layer or that is precoated with an appropriate polymer adhesive to anchor and bind the pile yarn. The carpet includes a primary backing that defines multiple openings through which a facing fiber is tufted or woven to produce a carpet face. The primary backing is generally in the form of a woven or nonwoven scrim, and can be made of any convenient material, such as, for example, jute, polypropylene, nylon, a polyester, a polyacrylate, cotton, wool, or other material. The facing fiber also can be of any convenient material, such as wool, cotton, nylon, a polyester, an acrylic fiber, polypropylene, polyethylene, a blend of any two or more of these, or the like. The unitary layer is suitably a latex, polyurethane or hot melt, or such a unitary backing in combination with one or more other composite layers such as a bitumen or a polyolefin. The facing fiber is typically in the form of fiber bundles that are tufted or woven through the primary backing to produce a carpet face and an opposing underside. The facing fibers may also be assembled in a structure known as a bonded carpet where the yarn bundles are not tufted through a primary fabric, but are minimally adhered together with a bonding polymer. Typically, bonded carpets will have additional structural components as noted herein.

The step of forming the layer on the textile is performed as soon as possible after the polyurethane-forming composition is fully formulated (including water and catalyst addition) and frothed, and prior to any significant expansion of the polyurethane-forming composition due to the reaction of the water with polyisocyanate groups. Depending on the boiling temperature of the physical blowing agent and the operating temperature, the froth may begin to expand somewhat due to the volatilization of the physical blowing agent before or during the formation of the froth into a layer. The density of the froth preferably is at least 250 grams/liter at the time it is formed into a layer on the textile.

A variety of equipment types are suitable for dispensing the polyurethane-forming composition and forming it into a layer. A preferred method of dispensing the composition is through a traversing dispensing nozzle, hose or head, which travels back and forth across the substrate to dispense the composition more or less evenly across the surface of the substrate. The composition is suitably dispensed upstream of a doctor blade, which gauges the composition to a desired thickness and helps to force the composition onto the surface of the substrate. Another suitable apparatus for forming the polyurethane-forming composition into a layer and gauging it is an air knife. In these methods, the textile is preferably moved continuously past one or more stations at which the polyurethane-forming composition is contacted with the textile, formed into a layer and gauged.

When the polyurethane-forming composition is dispensed upstream of a doctor blade, a puddle is formed. Dispensing rates and line speeds are advantageously selected to provide an average residence time in the puddle (i.e., time from dispensing to passing under the blade) of no greater than 300 seconds and preferably no greater than 200 seconds.

The components are preferably mixed, frothed and formed into a layer while at a temperature of no greater than 40° C., preferably from about 0° C. to about 30° C. and especially from about 18° C. to about 24° C., in order to minimize or prevent premature reaction.

The frothed composition is suitably applied at a coating weight of from about 10 to about 70 ounces/square yard (0.33-2.31 kg/m$^2$), and in particular from about 15 to about 30 ounces per square yard (0.49-0.99 kg/m$^2$). The thickness of the applied layer is generally from about 0.05 to about 0.75 inches (0.13-1.9 cm), preferably from 0.1 to 0.6 inches (0.25 to 1.5 cm and more preferably from about 0.2 to about 0.5 inch (0.52-1.27 cm).

The layer of the frothed polyurethane-forming composition is then cured with its top surface open to the atmosphere such that the frothed composition can freely rise to form a foamed polyurethane cushion. During the curing step, the water reacts with isocyanate groups to evolve carbon dioxide, which nucleates, forms bubbles and further expands the froth layer. The physical blowing agent may also continue to volatilize during the curing step and in such a case will also contribute to this further expansion. An important attribute of this invention is that the further expansion of the applied layer occurs after it has been formed on the substrate. It is this further expansion that allows the density of the applied foam layer to be reduced to 176 grams/liter or less. Expansion is desirably to a froth density of about 64 to 160 g/L and more preferably from 96 to 160 g/L and especially from 96 to 136 grams/liter. The cured foam should have a density within the same ranges.

In contrast to the process described in US 2007-0197674, no containment layer is applied to the polyurethane-forming layer. Instead, the top of the layer of the polyurethane-forming composition is open to the atmosphere, by which it is meant either that there is no layer of any material applied to the polyurethane-forming composition (i.e., it is uncovered) until after it has cured or, if such a layer is applied, the layer provides no significant barrier to the escape of gasses from the polyurethane-forming composition into the atmosphere. For example, an open-weave scrim or other material may be applied atop the polyurethane-forming composition as it cures, provided that the openings in the material constitute 50% or more, preferably 80% or more of its surface area. A jute or polyester backing having openings may be applied, for example, to lend additional dimensional stability to the coated textile, to facilitate the release of the textile from a glue-down installation, or for other reasons. Any such layer applied to the polyurethane-forming composition should be light enough in weight that it does not prevent the composition from expanding; preferably, any such layer weighs no more than 125 g/m$^2$, preferably no more than 100 g/m$^2$.

Curing is preferably effected by subjecting the layer of polyurethane-forming composition to an elevated temperature. It is generally desirable to select a curing temperature at which the polyurethane composition will cure to a tack-free state within about 30 minutes, preferably from about 2 to about 10 minutes and especially from about 2.5 to about 5 minutes. A preferred temperature range is from 80 to 170° C., especially from about 100 to 150° C., as these ranges are broad enough to permit the use of a wide selection of materials as the substrate, containment layer and/or intermediate layer. Curing is conveniently performed by passing the assembly through an oven at a rate that provides the desired residence time at the elevated curing temperature. A heated conveyor belt may be used to provide the heating required for the cure. The substrate may be heated somewhat, such as from 70 to 110° C. or more, prior to being contacted with the polyurethane-forming composition, so that these layers do not withdraw heat from the composition and so prolong or prevent its cure.

Therefore, a preferred polyurethane-forming composition for use in the invention will, in addition to the gel times stated above, cure to a tack-free state within 2 to 10 minutes, and preferably within 2.5 to 5 minutes, when exposed to an elevated temperature within the range of from 130 to 150° C.

After the polyurethane has cured sufficiently, the product is advantageously cooled to below 40° C., especially below 35° C., before being flexed or bent (such as by rolling or cascading it into an accumulator device). Cooling is especially preferred in cases where the product is intended to be die-cut or designed to function as independent modules, as in the case of carpet tiles.

The polyisocyanate includes at least one organic polyisocyanate, which may be an aromatic, cycloaliphatic, or aliphatic isocyanate. Examples of suitable polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4''-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used. Polyisocyanate compounds or mixtures thereof having from about 1.8 to about 2.5 isocyanate groups/molecule, on average, are preferred, especially those having an average of about 1.9 to about 2.3 isocyanate-groups/molecule. Prepolymers made by reacting a stoichiometric excess of any of the foregoing polyisocyanates with an isocyanate-reactive compound such as those described below can be used as well. Suitable prepolymers include soft segment prepolymers as described in U.S. Pat. No. 5,104,693 and hard segment prepolymers as described in U.S. Pat. No. 6,372,810.

The amount of polyisocyanate used is conveniently sufficient to provide an isocyanate index, i.e., 100 times the ratio of NCO groups to isocyanate-reactive groups in the starting reaction mixture, of from about 85 to about 130, preferably about 90 to 125, and especially from about 95 to 115.

The polyurethane-forming composition includes at least one polyol having a hydroxyl equivalent weight of at least 400. The hydroxyl equivalent weight of the polyol is preferably from about 500 to about 3000, especially from about 500 to about 1500. The polyol advantageously has an average nominal functionality of from about 1.8 to about 4, especially from about 2 to about 3 hydroxyl groups/molecule. A mixture of such polyols can be used. Suitable polyols include polyether polyols and polyester polyols. Polyether polyols are generally more preferred. Particularly suitable polyether polyols are polymers of propylene oxide, which may contain up to 20% by weight terminal poly (ethylene oxide) blocks, random copolymers of propylene oxide and up to about 15% by weight ethylene oxide, poly(tetramethylene oxide) polymers and poly(butylene oxide) polymers. Suitable polyester polyols include hydroxymethyl group-containing polyester polyols of the type described in WO 04/096882 and WO 04/096883. Preferred polyols have mainly secondary hydroxyl groups, such as at least 70%, 80%, 90% or 98% secondary hydroxyl groups. Secondary groups tend to react with polyisocyanates more slowly than do primary hydroxyl groups, and may be selected to further help to delay the onset of reaction as the composition is mixed, frothed and applied.

The polyurethane-forming composition also includes 0.2 to 2 parts by weight of water per 100 parts by weight of the polyol(s) having a hydroxyl equivalent weight of at least 400. Preferred amounts are from 0.6 to 2 parts by weight of water per 100 parts by weight polyol or from 1 to 1.8 parts by weight of water per 100 parts by weight polyol(s) having a hydroxyl equivalent weight of at least 400.

The physical blowing agent is any compound having a boiling temperature (at 1 atmosphere pressure) of −30 to 40° C., and which does not react with the other components of the polyurethane-forming composition under the conditions of the curing step. A preferred boiling temperature is 0 to 40° C., and a more preferred boiling temperature is 10 to 30° C. The physical blowing agent may be, for example, a hydrocarbon, a fluorocarbon, a hydrofluorocarbon, a hydrofluorochlorocarbon, a dialkyl ether, or other compound. Those having zero ozone depletion potential and a global warming potential of less than 20 are preferred. Among the suitable physical blowing agents are 1,1,1,3,3-pentafluoropropane and 1-chloro-3,3,3-trifluoropropene. The amount of physical blowing agent is suitably from 3 to 10 parts by weight per 100 parts by weight polyol(s) having a hydroxyl equivalent weight of at least 400. A more suitable amount is 5 to 8 parts by weight per 100 parts by weight polyol(s) having a hydroxyl equivalent weight of at least 400.

A chain extender or crosslinker may also be present in the polyurethane-forming composition. For purposes of this invention, a chain extender is a material having two isocyanate-reactive groups/molecule and an equivalent weight per isocyanate-reactive group of from about 30 to 150. A crosslinker, for purposes of this invention, is a compound having three or more isocyanate reactive groups and an equivalent weight per isocyanate-reactive group of 150 or less. The isocyanate-reactive groups may be hydroxyl, primary amine or secondary amine groups. Chain extenders and crosslinkers having hydroxyl groups are preferred because hydroxyl groups react more slowly and thus provide more time to apply and gauge the polyurethane-forming layer. Examples of suitable chain extenders include ethylene glycol, diethylene glycol, triethylene glycol, propylene glycol, dipropylene glycol, tripropylene glycol, 1,4-dimethylolcyclohexane, diethyltoluene diamine, 1,4-butane diol, 1,6-hexane diol, 1,3-propane diol, amine-terminated polyethers such as Jeffamine D-400 from Huntsman Chemical Company, amino ethyl piperazine, 2-methyl piperazine, 1,5-diamino-3-methyl-pentane, isophorone diamine, ethylene diamine, hexane diamine, hydrazine, piperazine, mixtures thereof and the like. Amine chain extenders can be blocked, encapsulated, or otherwise rendered less reactive in order to reduce the reactivity of the formulation and provide more working time to apply and gauge the foam layer. Chain extenders and chain extenders together advantageously constitute up to about 30%, especially up to about 20% of the combined weight of all isocyanate-reactive materials.

The polyurethane-forming composition also contains one or more catalysts, which promote the reaction of the polyisocyanate with the isocyanate-reactive materials. Suitable catalysts include tertiary amines, organometallic compounds, or mixtures thereof. Specific examples of these include di-n-butyl tin bis(mercaptoacetic acid isooctyl ester), dimethyltin dilaurate, dibutyltin dilaurate, dibutyltin diacetate, dibutyltin sulfide, stannous octoate, lead octoate, nickel acetylacetonate, ferric acetylacetonate, bismuth carboxylates, triethylenediamine, N-methyl morpholine, like compounds and mixtures thereof. An amine-blocked tin (IV) catalyst, such as those described in U.S. Pat. No. 5,491,174, can be used. A particularly preferred catalyst is a delayed action catalyst, such as a dialkyltin sulfide catalyst as described in U.S. Pat. No. 5,646,195. Of the last types, dimethyl-, dibutyl- and dioctyltin sulfide catalysts are of particular interest. Catalysts may be encapsulated in wax or other low-melting material in order to provide delayed reaction.

An amount of catalyst is advantageously employed such that the polyurethane forming composition has a gel time of at least 180 seconds. Gel time is conveniently measured by bringing all components to 20° C., mixing them at that temperature, and measuring the time required for the reacting mixture to attain a temperature of 49° C. due to heat generated by the reaction of the components. A preferred composition has a gel time of 180 to 600 seconds, especially from 180 to about 300 seconds.

If an organometallic catalyst is employed, such a cure can be obtained using from about 0.01 to about 0.5 parts per 100 parts of the polyurethane-forming composition, by weight. If a tertiary amine catalyst is employed, the catalyst preferably provides a suitable cure using from about 0.01 to about 3 parts of tertiary amine catalyst per 100 parts of the polyurethane-forming composition, by weight. The composition advantageously exhibits a cream time of at least 30 seconds and preferably from 30 to 90 seconds. Cream time is the time required for the polyurethane-forming composition to begin to expand once all ingredients are mixed.

The polyurethane-forming composition contains a filler, which reduces overall cost and may improve flame resistance, firmness and other physical properties. The amount of filler is 100 to 400 parts by weight per 100 parts by weight polyol(s) having a hydroxyl equivalent weight of at least 400, preferably 200 to 400 parts by weight and more preferably from 250 to 350 parts by weight on the same basis. Suitable fillers include talc, mica, montmorillonite, marble, barium sulfate (barytes), granite, milled glass, calcium carbonate, aluminum trihydrate, carbon, aramid, silica, silica-alumina, zirconia, talc, bentonite, antimony trioxide, kaolin, coal based fly ash and boron nitride.

The polyurethane-forming composition also includes at least one foam stabilizing surfactant, which serves to stabilize the gas bubbles until the composition has cured. Organosilicone surfactants such as those described in U.S. Pat. No. 4,483,894 are preferred. Typically about 0.5 to about 3 parts of surfactant are used per 100 parts by weight polyol(s) having a hydroxyl equivalent weight of at least 400.

Other additives may be used, including fire retardants, pigments, antistatic agents, reinforcing fibers, antioxidants, preservatives, acid scavengers, and the like.

The product of this process is a polyurethane cushion attached to one side of the substrate textile. The entire width of the textile preferably is covered with the attached cushion, except (optionally) for marginal areas along opposing edges which are gripped or otherwise held by some apparatus which holds or transports the textile during the coating process and curing process. The product may be, for example, a broadloom carpet; carpet tile; an underlayment or other cushioning product; a playground surface; matting such as a gymnasium floor or gym mats, artificial grass, and the like.

The following examples illustrate the present invention but are not intended to limit the scope thereof. All parts and percentages are by weight unless otherwise indicated. Unless stated otherwise, all molecular weights expressed herein are number average molecular weight.

EXAMPLES 1 AND 2 AND COMPARATIVE SAMPLES A AND B

Example 1

A polyol mixture is formed from 48.3 parts of a nominally trifunctional 3000 molecular weight random copolymer of 87% propylene oxide and 13% ethylene oxide; 40 parts of a 4800 molecular weight nominally trifunctional block copolymer of propylene oxide and ethylene oxide, 10 parts of a 2000 molecular weight, nominally difunctional block copolymer of propylene oxide and ethylene oxide, 4 parts diethylene glycol, 1 part castor oil, 1.2 parts of a silicone foam stabilizing surfactant, 1 part of a viscosity depressant and 2 parts of a 1% solution of dibutyl tin sulfide in a polyether polyol and 1.8 parts water. This polyol mixture is blended with 190 parts of a particulate calcium carbonate until the blend reaches a temperature of 120° F. (49° C.). The resulting filled polyol mixture is cooled to about 20° C.

The filled polyol is charged to a 2-inch (5.08 cm) Oakes dispensing/frothing machine. Separately, 43 parts of a polymeric MDI (isocyanate index 90) and 6 parts of HFC-245fa (1,1,1-3,3-pentafluoropropane) are charged to the Oakes machine, where they are combined with the filled polyol mixture and the resulting reaction mixture is frothed to a froth density of 301 g/L. The temperature of the exiting froth is 31° C.

A portion of the froth discharged from the Oakes machine is captured in a container and its temperature is measured until the exothermic heat of reaction raises it temperature to 49° C. The time required to reach this temperature (i.e., the gel time) is 6 minutes and 5 seconds.

Another portion of the froth is discharged onto a non-stick backing material, gauged to a thickness of approximately 7/16 inch to 5/8 inch (1.1 to 1.58 cm), and then cured uncovered in a 140° C. oven. The cured material is removed from the non-stick backing material. Test samples are prepared and density, 25% IFD and 65% IFD are measured, with results as in Table 1. Duplicate test samples are processed for 20,000 cycles in a Hexapod tumble drum tester according to ASTM D 5252, and the 25% IFD and 65% IFD are measured. The loss in IFD, compared to the original samples, is as reported in Table 1. A gain in IFD is reported as a negative loss.

Comparative Sample A is made in the same general manner, with these differences: First, the amount of water is increased to 2.3 parts by weight. The amount of catalyst is increased to 2.3 parts to accommodate the increased amount of water. The HFC-245fa is omitted. Because the viscosity of the composition is higher as a result of omitting the physical blowing agent, the amount of calcium carbonate particles is reduced from 190 parts to only 170 parts.

Comparative Sample C is made in the same way as Comparative Sample A, except the amount of catalyst is reduced to 1.4 parts, and the amount of calcium carbonate particles is 180 parts.

Example 2 is made the same way as Example 1, except the isocyanate index is increased to 100.

For each of Comparative Samples A and B and Example 2, the gel time of the frothed material and the density, 25% IFD and 65 IFD are measured as before. Results are as in Table 1.

TABLE 1

| Designation | Ex. 1 | Comp. A | Comp. B | Ex. 2 |
|---|---|---|---|---|
| Water, parts | 1.8 | 2.3 | 2.3 | 1.8 |
| HFC 245fa, parts | 6.0 | 0 | 0 | 6.0 |
| Catalyst solution, parts | 2.0 | 2.3 | 1.4 | 2.0 |
| Filler loading, parts | 190 | 170 | 180 | 190 |
| Isocyanate index | 90 | 90 | 90 | 100 |
| Froth Density, g/L | 301 | 351 | 321 | 307 |
| Gel time, min:sec | 6:05 | 3:50 | 3:30 | 5:19 |
| Curing temp, ° C. | 140 | 140 | 120 | 140 |
| Cured foam density, g/L | 160 | 183 | 197 | 171 |
| 25% IFD, kg | 2.7 | 6.0 | 9.3 | 3.4 |
| 25% ILD loss, % | 5 | 30 | 44 | −1 |
| 65% ILD loss, % | −22 | 7 | 13 | −18 |

Example 1 and Comparative Sample A are direct comparisons. Upon replacing the physical blowing agent with additional water and correspondingly increasing the catalyst level, one obtains a system with a much shorter gel time. The froth density for Comparative Sample A is significantly higher than Example 1. This indicates that Comparative Sample A has a higher viscosity that makes it more difficult to froth. Without a containment layer, the Comparative Sample A material produces a cured density of 183 g/L (or about 15% greater than Example 1). When the physical blowing agent replaces some of the water (as in Example 1), a lower density is obtained, despite the lack of a containment layer.

In Comparative Sample B, the catalyst level and cure temperature each are reduced to try (unsuccessfully) to obtain a slower-curing system. This leads to even higher density in the cured product.

Example 2 shows the effect of increasing the isocyanate index to 100. A slightly greater density is obtained than in Example 1, but the density is still well below that of the Comparative Samples.

The 25% ILD values indicate that the cured cushions of Examples 1 and 2 are much softer than Comparative Samples A and B, which is desirable in a cushioning product.

The 25% ILD loss and 65% ILD loss values indicated that the Example 1 and 2 materials are much more durable than the Comparative Samples. The negative values indicate an increase after durability testing. By contrast, the Comparative Samples show very significant loss in load-bearing on this test, especially at 25% indentation.

What is claimed is:

1. A process for making a cushion-backed textile, comprising:
    a) forming a frothed polyurethane-forming composition having a density of about 250 to 600 grams per liter wherein the polyurethane-forming composition includes one or more polyols including at least one polyol having a hydroxyl equivalent weight of at least 400, 0.25 to 2 parts of water per 100 parts by weight polyol(s) having a hydroxyl equivalent weight of at least 400, 3 to 10 parts by weight of a physical blowing agent having a boiling temperature of −30 to 40° C. per 100 parts by weight polyol(s) having a hydroxyl equivalent weight of at least 400, 100 to 400 parts by weight of a filler per 100 parts by weight polyol(s) having a hydroxyl equivalent weight of at least 400, a foam stabilizing surfactant, at least one polyisocyanate in an amount sufficient to provide an isocyanate index of from 85 to 130 and a polyurethane catalyst in an amount such that the polyurethane-forming composition has a gel time of at least 180 seconds;
    b) forming the uncured froth into a 0.05 to 0.75 inch (0.127 to 1.9 cm) thick layer across the top surface of a textile having a width of at least 24 inches (61 cm); and
    c) curing the layer of the frothed composition with its top surface open to the atmosphere such that the frothed composition can freely rise to form a foamed polyurethane cushion having a density of no greater than 176 grams/liter (11 pounds/cubic foot) bonded to the textile.

2. The process of claim 1 wherein the amount of water is 1 to 1.8 parts by weight per 100 parts by weight polyol(s) having a hydroxyl equivalent weight of at least 400.

3. The process of claim 2 wherein the physical blowing agent has a boiling temperature of 10 to 30° C.

4. The process of claim 3 wherein the amount of physical blowing agent is 5 to 8 parts by weight per 100 parts by weight polyol(s) having a hydroxyl equivalent weight of at least 400.

5. The process of claim 3 wherein the foamed polyurethane cushion has a density of 96 to 160 g/L.

6. The process of claim 3, wherein step a) is performed by mixing the polyol(s) and the filler, and combining the mixture of polyol and filler with the polyisocyanate and the physical blowing agent simultaneously with the frothing step by adding the polyisocyanate and physical blowing agent as separate streams into the frothing apparatus.

7. The process of claim 3, wherein the water is added after the frothing step.

8. The process of claim 3, wherein step a) is performed by mixing the polyol(s) and the filler, and then combining the mixture of polyol and filler with the polyisocyanate, and then adding the physical blowing agent and water simultaneously to frothing.

9. The process of claim 3, wherein the catalyst is added after the frothing step.

10. The process of claim 3 wherein step b) is performed by dispensing the frothed polyurethane-forming composition to form a puddle on the substrate, and then passing the puddle under a doctor blade to gauge the layer.

* * * * *